Patented Dec. 2, 1952

2,620,349

UNITED STATES PATENT OFFICE 2,620,349

COMPOSITIONS COMPRISING ORGANIC ISOCYANATES AND METHOD FOR PREPARING SAME

Robert J. Slocombe, Dayton, Ohio, assignor to Monsanto Chemical Company, St. Louis, Mo., a corporation of Delaware No Drawing. Application December 6, 1950, Serial No. 199,565

14 Claims. (Cl. 260—453)

The present invention relates to novel compositions of matter comprising organic mono and/or polyisocyanates and a relatively small amount of a hydrolyzable chloride and to a method of producing same.

In accordance with one method of making plastic foams, an alkyd resin containing free carboxyl groups is reacted with an organic polyisocyanate at relatively low temperatures to produce an infusible resin and carbon dioxide in accordance with the following equation:

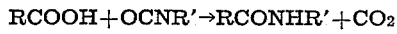
$$RCOOH + OCNR' \rightarrow RCONHR' + CO_2$$

wherein R and R' are organic radicals. The development of carbon dioxide within the plastic mass causes it to expand and fill the confining space, and ultimately results in the production of a spongy material which adheres strongly to the walls of the container. This product finds use in the field of low temperature insulation and buoyant flotation.

In the practice of the above method, relatively pure organic polyisocyanates have been employed with some degree of success. However, it has been found that they react too rapidly with alkyd resins of the above type to yield a product having the desired degree of porosity. Consequently, there has arisen in the art a demand for organic polyisocyanates of retarded reaction rate.

It is, therefore, the primary object of the instant invention to provide new compositions of matter including organic polyisocyanates, which exhibit a reaction rate with alkyd resins that is substantially slower than the relatively pure polyisocyanates.

Another object of the invention is to provide new compositions of matter comprising an organic polyisocyanate and from 0.02% to about 0.06% by weight of a hydrolyzable chloride, which compositions are eminently suitable for reaction with alkyd resins in producing foamed resins for use in the field of low temperature insulation and buoyant flotation.

A further object is to provide a method of retarding the reaction rate of organic polyisocyanates with alkyd resins in the production of foamed resins, whereby close control over the rate of carbon dioxide evolution is achieved.

Other objects and advantages will become apparent to those skilled in the art as the description of the invention unfolds.

I have made the surprising discovery that the above objectives may be achieved by adjusting the hydrolyzable chloride content of the above polyisocyanates so that it falls within the limits of from 0.02% to about 0.06% by weight. This adjustment is accomplished by adding anhydrous hydrogen chloride to the relatively pure materials or solutions thereof, by blending two or more polyisocyanates or solutions thereof having relatively low and high contents of hydrolyzable chloride, and by controlling the decomposition of the carbamyl chloride into the corresponding isocyanate and hydrogen chloride and then incompletely removing the latter so as to leave therein a hydrolyzable chloride content within the above limits.

The method of making polyisocyanates per se does not constitute a part of the present invention as any of the conventional procedures may be employed. However, the selected method of manufacture does affect the adjusting technique as obviously the content of the desired impurity must in some instances be supplied by means of added hydrolyzable chloride-yielding substances or by the addition of anhydrous hydrogen chloride where this compound is not used or formed in the reaction or where the formation of carbamyl chloride does not take place. On the other hand, where the method involves the foregoing conditions, all of the above-mentioned adjusting techniques may be used.

The identity of the compound or compounds providing the hydrolyzable chloride content is not known with certainty, but is believed to be the carbamyl chloride corresponding to the isocyanate since hydrogen chloride readily reacts with the latter in accordance with the following equation:

$$R(CNO)_x + XHCl \rightarrow R(NHCOCl)_x$$

wherein R is an organic radical and X is an integer at least equal to 1.

The table hereinafter presented illustrates for the purpose of comparison compositions which fall inside and outside the scope of the instant invention.

| | Meta-tolylene Diisocyanate | Percent By Weight Ortho-Dichlorobenzene | Percent By Weight Hydrolyzable Chloride Content |
|---|---|---|---|
| 1 | Remainder | 4.00 | 0.011 |
| 2 | do | 3.37 | 0.013 |
| 3 | do | 1.02 | 0.019 |
| 4 | do | 2.63 | 0.020 |
| 5 | do | 2.61 | 0.023 |
| 6 | do | 1.08 | 0.026 |
| 7 | do | 0.85 | 0.032 |
| 8 | do | 0.79 | 0.043 |
| 9 | do | 1.53 | 0.045 |
| 10 | do | 0.41 | 0.059 |

The meta-tolylene diisocyanate content of the above compositions was prepared by reacting phosgene with meta-tolylene diamine in the presence of o-dichlorobenzene and at a temperature within the range of 50° C. to 140° C. The crude reaction product thus obtained was degassed by treatment with natural gas and then subjected to fractional distillation to separate meta-tolylene diisocyanate in a relatively pure form. In each case, the meta-tolylene diisocyanate was adjusted by adding hydrogen chloride thereto; however, composition 3 involved an additional adjusting step which consisted in mixing 1 part of composition 10 with 4 parts of another sample of meta-tolylene diisocyanate containing only 0.010% by weight of hydrolyzable chloride.

With the exception of 1, 2 and 3, the above compositions were found to have the desired retarded reaction rate with alkyd resins, and hence they were suitable for use in the production of foamed resins. However, composition 3 did not quite meet the required specifications from the standpoint of reaction rate whereas composition 4 did, thus indicating that a hydrolyzable chloride content of at least 0.02% is essential to provide a product having the desired properties. This fact was further substantiated by raising the hydrolyzable chloride content of compositions 1 and 2 to 0.029% and 0.028%, respectively. As soon as this was done, the reaction rates of the foregoing compositions were lowered to the desired level.

The hydrolyzable chloride content of the above composition was determined by extracting the chloride from the isocyanate by means of a solvent consisting of methanol and water. The resulting extract was then subjected to a potentiometric titration of chloride ion concentration with a standard silver nitrate solution.

From the data thus obtained, the hydrolyzable chloride content was calculated in the following manner:

Percent hydrolyzable chloride:

$$\frac{\text{Ml. AgNO}_3 \times \text{normality} \times 3.55}{\text{Sample weight of polyisocyanate}}$$

The following are illustrative examples of compositions which are eminently suitable for use in the production of foamed resins:

Example I

Parts by weight
(1) An alkyd resin produced by reacting together 2.5 mols of adipic acid, 0.5 mol of phthalic anhydride and 4.0 moles of trimethylol propane _____ 2
(2) Meta - tolylene diisocyanate containing 0.02% to 0.06% by weight of a hydrolyzable chloride _____ 1

Example II (1) An alkyd resin produced by reacting together 2.5 mols of adipic acid, 0.5 mol of phthalic anhydride and 4.0 moles of trimethylol propane _____ 2
(2) Ethylbenzene-α,3-diisocyanate containing 0.02% to 0.06% by weight of a hydrolyzable chloride _____ 1

Example III (1) An alkyd resin produced by reacting together 2.5 mols of adipic acid, 0.5 mol of phthalic anhydride and 4.0 moles of trimethylol propane _____ 2
(2) 1 chlorophenyl-2,4-diisocyanate containing 0.02% to 0.06% by weight of a hydrolyzable chloride _____ 1

Example IV (1) An alkyd resin produced by reacting together 2.5 mols of adipic acid, 0.5 mol of phthalic anhydride and 4.0 moles of trimethylol propane _____ 2
(2) Diisocyanatodiphenyl methane containing 0.02% to 0.06% by weight of a hydrolyzable chloride _____ 1

Example V (1) An alkyd resin produced by reacting together 2.5 mols of adipic acid, 0.5 mol of phthalic anhydride and 4.0 moles of trimethylol propane _____ 2
(2) Diphenyl - 4,6,4'triisocyanate containing 0.02% to 0.06% by weight of a hydrolyzable chloride _____ 1

In place of the alkyd resin disclosed in the above examples, any other alkyd resin containing free carboxyl groups or both free carboxyl and hydroxyl groups may be employed.

The proportions of the polyisocyanates and alkyd resins may vary widely depending upon the specific gravity and product strength desired.

The above foamed resins may be used in the field of low temperature insulation and buoyant flotation. Moreover, they may be used for filling aircraft-sections, in sandwich constructions and in the manufacture of radomes.

In addition to the applications mentioned above, the novel compositions of the instant invention may be reacted with alkyd resins to form products which are highly useful in the production of lacquers, coatings and adhesives.

Although the foregoing description has been confined to organic polyisocyanates and particularly to meta-tolylene diisocyanate, the invention is by no means limited thereto as it is also applicable to mono and polysubstituted mono- and polyisocyanates where the substituting group is halogen, alkyl, aryl, alkoxy, aryloxy, nitro, carboalkoxy (—COOR), sulfoalkoxy (—SO$_3$R) or another substituent that does not contain an active hydrogen which might react with the —NCO group.

As illustrative examples of organic mono and polyisocyanates within the scope of the invention there may be mentioned the following compounds: ethylbenzene-α, 3-diisocyanate, 1 chlorophenyl-2, 4 diisocyanate, 4-phenyl isocyanate, octadecyl isocyanate, biphenyl isocyanate, β-naphthyl isocyanate, p-nitro-phenyl isocyanate, o-tolylene diisocyanate, p-tolylene diisocyanate, methylene-bis-(4-phenyl isocyanate), m-, o- and p-phenylene diisocyanate, diphenyl-3,3' dimethyl-4,4' diisocyanate, diphenyl-3,3' dimethoxy 4.4' diisocyanate, 1, 6-hexamethylene diisocyanate, 2,3-dimethyl tetramethylene diisocyanate, decamethylene diisocyanate, 2-chloro-trimethylene diisocyanate, di(p - isocyanylcyclohexyl) methane, 5-nitro 1, 3 phenylene diisocyanate, p-dyxylyl methane-4,4' di-isocyanate, ethylene diisocyanate, dodecamethylene diisocyanate, trimethylene diisocyanate, tetramethylene diisocyanate, penta-methylene diisocyanate, propylene 1,2-diisocyanate, butylene-1,2 diisocyanate, butylene 2,3 diisocyanate, cyclohexylene 1,2-diisocyanate, 1-methyl-phenylene-2,4-diisocyanate, naphthalene 1,4-diisocyanate, naphthalene 1,5-diisocyanate, xylene diisocyanate, organic diisocyanates containing hetero atoms such as OCN—CH$_2$—O—CH$_2$NCO,

OCNCH$_2$CH$_2$—O—CH$_2$NCO and OCN(CH$_2$)$_3$—S—(CH$_2$)$_3$NCO and organic triisocyanates such as 4,4', 4" triisocyano triphenyl methane, diphenyl-4, 6, 4'-triisocyanate, etc.

Where reference is made in the specification to a "hydrolyzable chloride," it is to be understood that hydrolyzable chlorine, as distinguished from a complete compound containing chlorine, is intended.

Since it is obvious that various changes and modifications may be made in the above compositions without departing from the nature or spirit thereof, this invention is not restricted thereto except as set forth in the appended claims.

What I claim is:

1. A composition of matter comprising an organic isocyanate and a carbamyl chloride in sufficient amounts to yield from 0.02% to about 0.06% by weight of hydrolyzable chlorine.

2. A composition of matter comprising a compound selected from the group consisting of organic di- and triisocyanates and a carbamyl chloride in sufficient amounts to yield from 0.02% to about 0.06% by weight of hydrolyzable chlorine.

3. A composition of matter comprising a compound selected from the group consisting of organic di- and triisocyanates and a carbamyl chloride in sufficient amounts to yield from 0.02% to about 0.03% by weight of hydrolyzable chlorine.

4. A composition of matter comprising an organic diisocyanate and a carbamyl chloride in sufficient amounts to yield from 0.02% to about 0.03% by weight of hydrolyzable chlorine.

5. A composition of matter comprising an organic triisocyanate and a carbamyl chloride in sufficient amounts to yield from 0.02% to about 0.03% by weight of hydrolyzable chlorine.

6. A composition of matter comprising metatolylene diisocyanate and the corresponding carbamyl chloride in sufficient amounts to yield from 0.02% to about 0.06% by weight of hydrolyzable chlorine.

7. A composition of matter comprising ethylbenzene-α, 3-diisocyanate and the corresponding carbamyl chloride in sufficient amounts to yield from 0.02% to about 0.06% by weight of hydrolyzable chlorine.

8. A composition of matter comprising 1 chlorophenyl-2,4 diisocyanate and the corresponding carbamyl chloride in sufficient amounts to yield from 0.02% to about 0.06% by weight of hydrolyzable chlorine.

9. A composition of matter comprising diisocyanatodiphenyl methane and the corresponding carbamyl chloride in sufficient amounts to yield from 0.02% to about 0.06% by weight of hydrolyzable chlorine.

10. A composition of matter comprising diphenyl-4, 6, 4' triisocyanate and the corresponding carbamyl chloride in sufficient amounts to yield from 0.02% to about 0.06% by weight of hydrolyzable chlorine.

11. The method of retarding the reaction rate of organic isocyanates which comprises adding anhydrous HCl thereto in an amount sufficient to bring the carbamyl chloride content of said compound to a range yielding from 0.02% to about 0.06% by weight of hydrolyzable chlorine.

12. The method of retarding the reaction rate of a compound selected from the group consisting of organic di- and triisocyanates which comprises adding anhydrous HCl thereto in an amount sufficient to bring the carbamyl chloride content of said compound to a range yielding from 0.02% to about 0.03% by weight of hydrolyzable chlorine.

13. The method of retarding the reaction rate of a compound selected from the group consisting of organic di- and triisocyanates, which comprises adding anhydrous HCl thereto in an amount sufficient to bring the corresponding carbamyl chloride content within the range yielding from 0.02% to about 0.06% by weight of hydrolyzable chlorine.

14. The method of retarding the reaction rate of metatolylene diisocyanate, which comprises adding anhydrous HCl thereto in an amount sufficient to bring the corresponding carbamyl chloride content within the range yielding from 0.02% to about 0.06% by weight of hydrolyzable chlorine.

ROBERT J. SLOCOMBE.

REFERENCES CITED

The following references are of record in the file of this patent:

UNITED STATES PATENTS

| Number | Name | Date |
|---|---|---|
| 2,437,867 | Verbanc | Mar. 16, 1948 |
| 2,476,779 | Sturgis | July 19, 1949 |